United States Patent
Sigl et al.

[11] Patent Number: 5,116,108
[45] Date of Patent: May 26, 1992

[54] DRIVE SLIP CONTROL SYSTEM

[75] Inventors: Alfred Sigl, Sersheim; Manfred Meissner, Unterriexingen; Thomas Isella, Markgröningen; Johannes Schmitt, Schwieberdingen, all of Fed. Rep. of Germany

[73] Assignee: Robert Bosch GmbH, Stuttgart, Fed. Rep. of Germany

[21] Appl. No.: 543,821

[22] PCT Filed: Dec. 8, 1988

[86] PCT No.: PCT/EP88/01121
§ 371 Date: Jul. 6, 1990
§ 102(e) Date: Jul. 6, 1990

[87] PCT Pub. No.: WO89/06615
PCT Pub. Date: Jul. 27, 1989

[30] Foreign Application Priority Data

Jan. 19, 1988 [DE] Fed. Rep. of Germany ....... 3801321

[51] Int. Cl.$^5$ .............. B60T 8/32; B60T 8/62; B60K 28/16
[52] U.S. Cl. .................. 303/103; 303/106; 303/110; 303/96; 364/426.02; 180/197

[58] Field of Search .......... 180/197; 364/426.01, 364/426.02, 426.03; 303/100, 102, 105, 107, 108, 109, 110, 106, 103, 96

[56] References Cited

U.S. PATENT DOCUMENTS

| 3,667,813 | 6/1972 | Burckhardt et al. | 303/96 |
| 3,779,331 | 12/1973 | Burckhardt et al. | 303/96 X |
| 3,893,535 | 7/1975 | Burckhardt et al. | 303/96 X |
| 4,154,487 | 5/1979 | Vannini et al. | |
| 4,583,611 | 4/1986 | Frank et al. | 303/96 X |
| 4,984,165 | 1/1991 | Müller et al. | 180/197 X |

FOREIGN PATENT DOCUMENTS 2148303 4/1973 Fed. Rep. of Germany.
3603765 8/1986 Fed. Rep. of Germany.

Primary Examiner—Douglas C. Butler
Attorney, Agent, or Firm—Felfe & Lynch

[57] ABSTRACT

Wheel slippage and wheel acceleration signals are used to build up and decrease brake pressure stepwise at the vehicle wheels. Combined signals are used to modify the rate of pressure build-up and decrease.

12 Claims, 1 Drawing Sheet

DRIVE SLIP CONTROL SYSTEM

BACKGROUND OF THE INVENTION

The invention relates to a drive slip control system where the deviations of the speeds of the driven wheels from the vehicle speed and the accelerations of the driven wheels are determined from the measured speeds of the driven and non-driven wheels. When deviation and acceleration thresholds are reached, signals are generated which are used to change the brake pressure at the corresponding wheels in stages.

In a drive slip control system, it is known (DE-A1 33 31 297) to determine the deviation of the wheel speed of the driven wheel from the vehicle speed and to generate a first threshold signal when a first threshold is exceeded. The wheel acceleration is then additionally determined, and a second threshold signal is generated when a second threshold is exceeded. These threshold values are then combined and used to change the brake pressure. The pressure can be changed in steps (pulsed).

ADVANTAGES OF THE INVENTION

The drive slip control system in accordance with the invention is based on this piece of prior art and optimizes the pressure variation. The result is a user-friendly control.

The brake pressure is built up at the corresponding wheel when the deviation signal is greater than a first value close to zero or zero and the corresponding acceleration signal is greater than a second value close to zero or zero. The brake pressure is reduced when the deviation is below a first value, when the deviation is equal to zero, or when the deviation is above a first value and the corresponding acceleration is less than a second value or zero.

DETAILED DESCRIPTION OF THE PREFERRED EMBODIMENT

Figure 1:
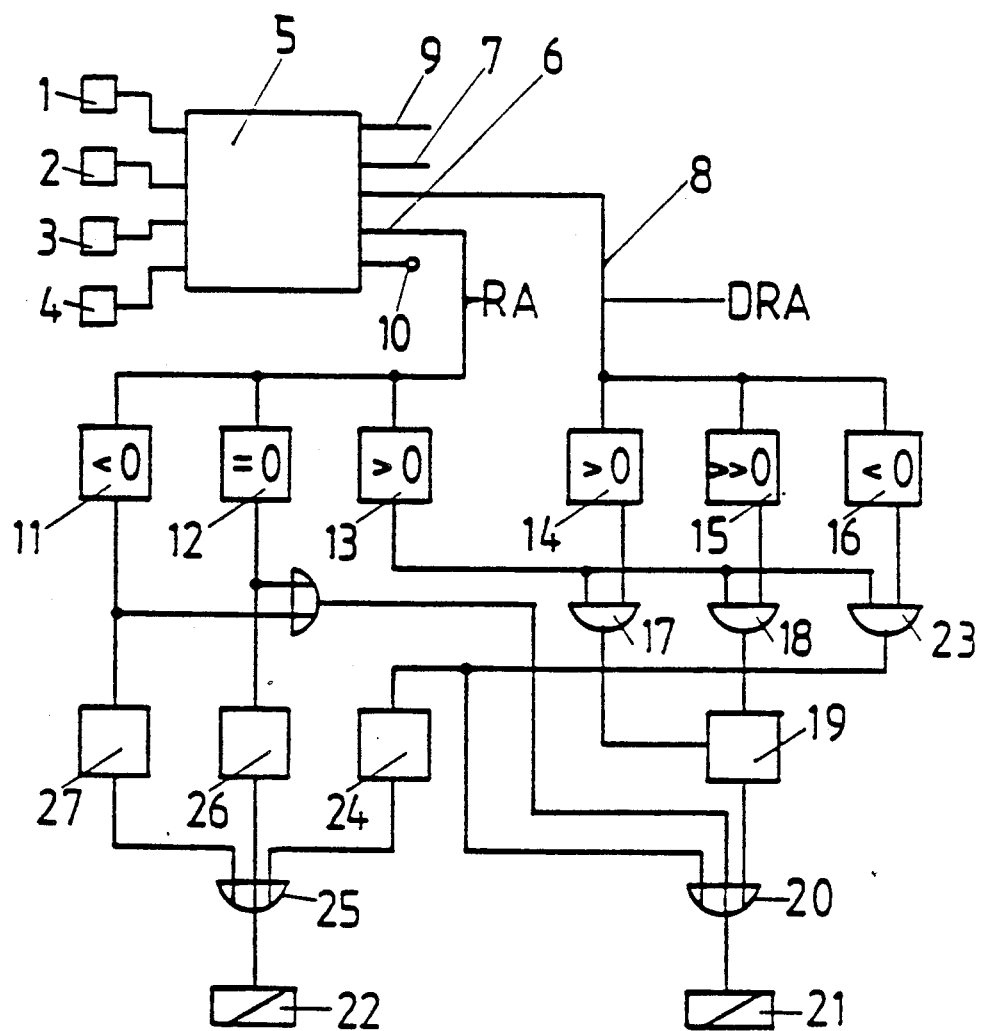
FIG. 1 is a block diagram of an electronic unit and FIG. 2 shows the appertaining hydraulic unit.

In FIG. 1, the speed sensors 1 and 2 for the driven wheels and the speed sensors 3 and 4 for the non-driven wheels are connected to a signal processor 5. The latter uses the supplied signals to form, for the individual driven wheels, the deviations $RA_R$ and $RA_L$ of the wheel speed from the vehicle speed and the signals $DRA_R$ and $DRA_L$ which correspond to the wheel acceleration. The signals $RA_R$ and $RA_L$ are supplied to lines 6 and 7, and the signals corresponding to the acceleration to lines 8 and 9. With the beginning of the control until the end thereof, an output signal is available on a line 10.

The deviations $RA_R$ and $RA_L$ for the driven wheels can be formed as follows:

$$RA = \left[ V_1 - \left( \frac{V_3 + V_4}{2} + \text{prescribed slippage threshold} \right) \right]$$

wherein $V_1$ is the wheel speed of the sensor 1 etc. The prescribed slippage threshold can, for example, be $$2 \text{ km/h} + 0.05 \frac{V_3 + V_4}{2}.$$

The signals DRA can be recovered by differentiating the corresponding signals RA.

For reasons of simplicity, the control of only one wheel is considered in the following description. Line 6 is connected to three threshold stages 11, 12, 13. The latter supply an output signal if the input signal is greater than zero (13), equal to zero (12) or less than zero (11). Here zero represents the first value. The signal DRA is also supplied to three threshold stages 14, 15, 16 which supply signals when DRA is greater than zero (14), greater than a prescribed positive threshold S (S>0) (15) or less than zero (16). Here zero represents the second value. The threshold S represents a third value, which is greater than the second value.

As soon as the threshold stages 13 and 14 are exceeded (RA>0; DRA>0), and AND-gate 17 opens and the output signal thereof activates a pulse generator 19. Via an OR-gate 20, the output signal of this pulse generator activates an inlet valve 21.

Figure 2:
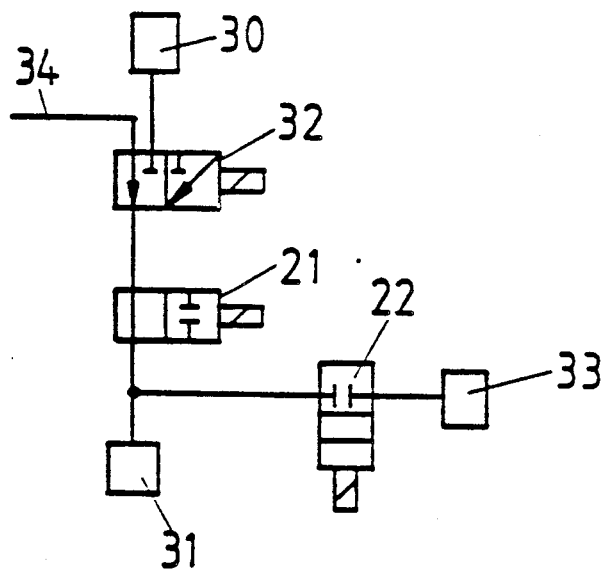

As seen in FIG. 2, this valve 21 is interposed between a pressure source 30 and the wheel brake 31. A switch-on valve 32 which activates the pressure source 30 only during control via line 10 is also interposed upstream. Further, an outlet valve 22 is provided to release pressure at the brake 31 to a reservoir 33. When the pressure source 30 is activated, the valves 21 and 22 can be used to vary the brake pressure at the brake 31. The valves 21, 22 can also serve the purpose of an anti-lock brake control. In this case, the pressure is supplied via a line 34.

When the pressure source 30 is activated, the pulsed actuation of the valve 21 causes a pulsed increase of the brake pressure. The gradient of the increase is hereby determined by the pulse-pause-relation of the pulse generator 19.

If, in addition, signal DRA exceeds the thresholds of the threshold stage 15, an AND-gate 18 opens. The output signal thereof changes the pulse-pause-relation of the pulse generator 19 such that the pressure build-up gradient is increased.

If then in a positive deviation (RA>0), the signal DRA becomes smaller than zero, an AND-gate 23 opens. The output signal thereof activates a pulse generator 24, the pulses of which actuate an outlet valve 22 via an OR-gate 25. The pressure is thus reduced with a prescribed gradient while being pulsed. If the deviation RA reaches the value zero, another pulse generator 26 is activated independent of DRA which also slowly reduces pressure because of its pulse-pause-relation. If the deviation becomes negative (RA>0), yet another pulse generator 27 serves to faster reduce pressure. The input signals of the pulse generators 24, 26, 27, are supplied to the inlet valve 21 via the OR-gate 20 since the inlet valve must block the pressure supply during pressure reduction phases.

When RA>0 and DRA>0, it is also possible to calculate the pulse-pause relation directly from the sum RA+DRA either by decreasing the pause time of the inlet valve, or by increasing the pulse time of the inlet valve, or both, when the sum is larger than a threshold value.

We claim:

1. Drive slip control system for a vehicle having driven wheels and non-driven wheels which rotate at respective wheel speeds, said system comprising means for determining the speeds of the driven wheels, means for determining the speeds of the non-driven wheels, means for determining a vehicle speed, means for determining deviations of the speeds of the driven wheels from the vehicle speed, means for determining accelerations of the driven wheels, means for increasing brake pressure at at least one of said driven wheels at least temporarily in pulses when the deviation of the speed of said at least one of said driven wheels is greater than a first value and the acceleration of said at least one of said driven wheels is greater than a second value, means for decreasing brake pressure at said at least one of said driven wheels at least temporarily in pulses when the deviation of the speed of said at least one of said driven wheels is above said first value and the acceleration of said at least one of said driven wheels is below said second value.

2. Drive slip control system as in claim 1 further comprising means for increasing brake pressure at at least one of said driven wheels at least temporarily in pulses when the deviation of the speed of said at least one of said driven wheels is greater than said first value and the acceleration of said at least one of said driven wheels is greater than a third value which is greater than said second value, said means increasing said brake pressure faster than when said acceleration is less than said third value.

3. Drive slip control system as in claim 1 further comprising means for decreasing brake pressure at said at least one of said driven wheels at least temporarily in pulses when the deviation of the speed of the said at least one of said driven wheels is equal to said first value, said means decreasing said brake pressure more slowly than when said deviation of said speed is less than said first value.

4. Drive slip control system as in claim 1 wherein said first value is zero.

5. Drive slip control system as in claim 1 wherein said second value is zero.

6. Method for controlling slip of the driven wheels in a vehicle having driven wheels and non-driven wheels which rotate at respective wheel speeds, said method comprising determining the speeds of the driven wheels, determining the speeds of the non-driven wheels, determining a vehicle speed, determining deviations of the speeds of the driven wheels from the vehicle speed, determining accelerations of the driven wheels, increasing brake pressure at at least one of said driven wheels at least temporarily in pulses when the deviation of the speed of said at least one of said driven wheels is greater than a first value and the acceleration of said at least one of said driven wheels is greater than a second value, decreasing brake pressure at said of at least one said driven wheels at least temporarily in pulses when the deviation of the speed of said at least one of said driven wheels is below said first value, and decreasing brake pressure at said at least one of said driven wheels at least temporarily in pulses when the deviation of the speed of said at least one of said driven wheels is above said first value and the acceleration of said at least one of said driven wheels is below said second value.

7. Method as in claim 6 wherein said brake pressure is increased faster when said acceleration is greater than a third value which is greater than said second value, than when said acceleration is less than said third value.

8. Method as in claim 7 wherein said pulses have pauses therebetween, thus defining a pulse-pause relation, said brake pressure being increased faster by changing the pulse-pause relation.

9. Method as in claim 6 wherein said brake pressure is decreased more slowly when said deviation is equal to said first value then when said brake pressure is less than said first value.

10. Method as in claim 9 wherein said pulses have pauses therebetween, said brake pressure being decreased more slowly by increasing the pause time between pulses.

11. Method as in claim 6 wherein said first value is zero.

12. Method as in claim 6 wherein said second value is zero.

* * * * *

UNITED STATES PATENT AND TRADEMARK OFFICE
CERTIFICATE OF CORRECTION

PATENT NO. : 5,116,108

DATED : May 26, 1992

INVENTOR(S) : Sigl et al.

It is certified that error appears in the above-identified patent and that said Letters Patent is hereby corrected as shown below:

Column 1, line 23, delete "ADVANTAGES OF THE INVENTION" and insert -- SUMMARY OF THE INVENTION --.

Column 2, line 56, delete "(RA > 0)" and insert -- (RA < 0) --.

Signed and Sealed this

Twenty-first Day of September, 1993

Attest:

BRUCE LEHMAN

*Attesting Officer*     *Commissioner of Patents and Trademarks*